United States Patent

Döll et al.

Patent Number: 5,887,684
Date of Patent: Mar. 30, 1999

[54] DISK BRAKE CALLIPER

[75] Inventors: Andreas Döll; Rudolf Thiel, both of Frankfurt am Main, Germany

[73] Assignee: ITT Manufacturing Enterprises, Inc., Wilmington, Del.

[21] Appl. No.: 793,814
[22] PCT Filed: Aug. 17, 1995
[86] PCT No.: PCT/EP95/03265
§ 371 Date: Aug. 26, 1997
§ 102(e) Date: Aug. 26, 1997
[87] PCT Pub. No.: WO96/07033
PCT Pub. Date: Mar. 7, 1996

[30] Foreign Application Priority Data

Aug. 31, 1994 [DE] Germany ............... 44 30 957.0

[51] Int. Cl.$^6$ ...................................................... F16D 55/00
[52] U.S. Cl. ..................... 188/71.1; 188/370; 92/170.1; 137/15
[58] Field of Search ................................. 188/71.1, 72.4, 188/218, 369, 370, 73.31; 92/168, 169.1, 170.1, 171.1; 164/96, 97, 98; 137/15, 315, 375

[56] References Cited

U.S. PATENT DOCUMENTS

| 4,100,669 | 7/1978 | Pemper . |
| 4,156,532 | 5/1979 | Kawaguchi et al. ................. 188/370 X |
| 4,705,093 | 11/1987 | Ogino .............................. 188/73.31 X |
| 4,875,556 | 10/1989 | Shaw et al. ......................... 188/370 X |
| 4,916,789 | 4/1990 | Robinson . |
| 5,168,964 | 12/1992 | Shimmell . |
| 5,172,793 | 12/1992 | Temple et al. .......................... 188/72.4 |
| 5,234,080 | 8/1993 | Pantale ............................... 188/73.31 X |
| 5,249,649 | 10/1993 | Emmons ............................... 188/370 X |
| 5,433,300 | 7/1995 | Barlow et al. ........................ 188/370 X |

FOREIGN PATENT DOCUMENTS

| 2950660 | 7/1981 | Germany . |
| 3336304 | 4/1985 | Germany . |
| 3642978 | 6/1988 | Germany . |
| 4244502 | 3/1994 | Germany . |
| 4236084 | 4/1994 | Germany . |
| 62-56631 | 3/1987 | Japan .................................. 188/73.31 |
| 2079653 | 1/1982 | United Kingdom . |
| WO9306382 | 4/1993 | WIPO . |

OTHER PUBLICATIONS

Search Report of German Patent Office for Application P4430957.0. dated Jan. 24, 1995.
Patent Abstract of Japan Publication No. JP6159405 published Jun. 7, 1994.
English translation of the International Preliminary Examination Report related to PCT/EP/95/03265 filed Aug. 17, 1995.

Primary Examiner—Robert J. Oberleitner
Assistant Examiner—Pamela J. Lipka
Attorney, Agent, or Firm—Rader, Fishman & Grauer PLLC

[57] ABSTRACT

In order to obtain a brake caliper for a disk brake which is light and at the same time resistant to bending, the caliper is manufactured from a metal-matrix composite material having embedded ceramic particles. In order not to have to carry out the necessary subsequent machining steps in the hard composite material, it is provided according to the invention that, at least in the area of the brake cylinder and the supply connection, the caliper housing is provided with one or several inserts made of an easy to machine material, preferably an aluminum alloy.

6 Claims, 3 Drawing Sheets

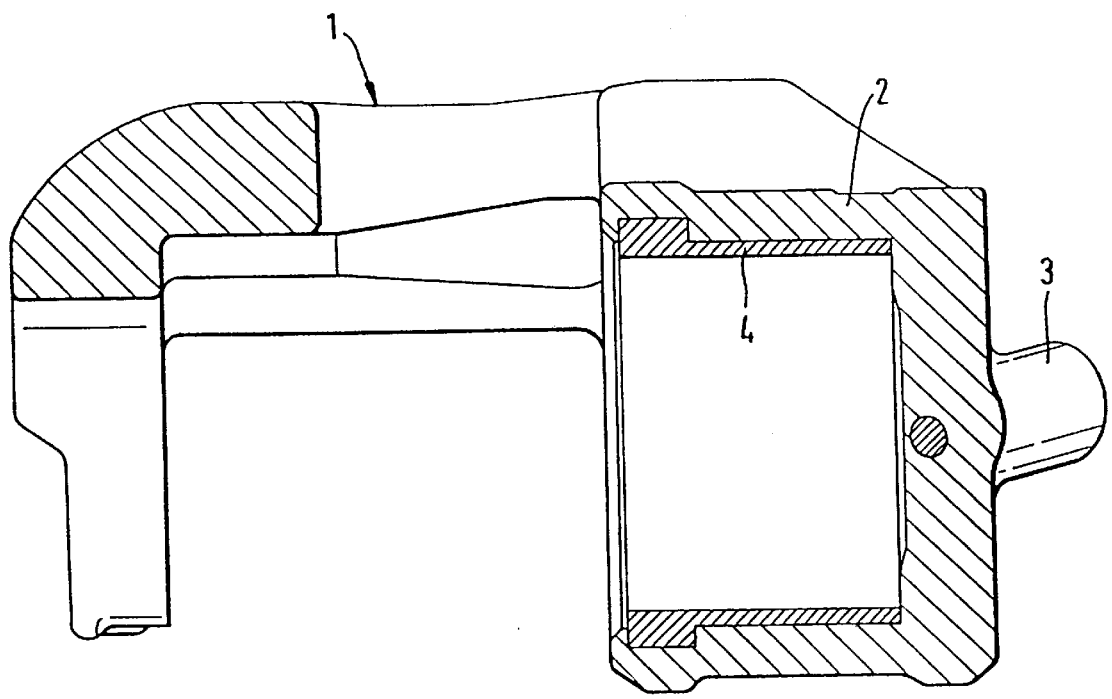
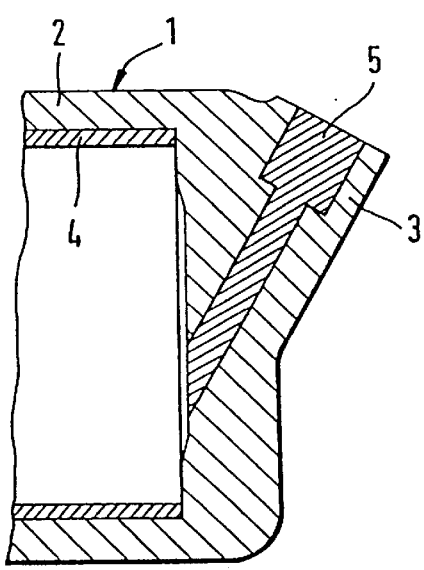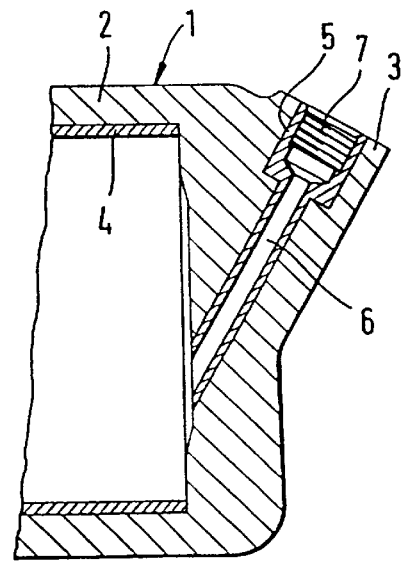
Fig. 1
Fig. 2
Fig. 4

DISK BRAKE CALLIPER

BACKGROUND OF THE INVENTION

The invention involves a caliper for disk brakes according to the preamble of claim 1.

Higher and higher demands are being placed on the performance of modern disk brakes. Thus the brake itself and especially the caliper housing should be light on the one hand, in order to minimize the unsprung weight on the vehicle wheel while on the other hand, the caliper must be very rigid so that it does not bend very much under large stress.

The use of aluminum alloys for the brake caliper, instead of the conventional iron workpieces, is increasing in order to save weight. Aluminum alloys have the disadvantage, however, that their strength decreases for temperatures above 300° C. Such temperatures can certainly occur for disk brakes in extreme cases. To solve this problem materials are suitable which are known as metal-matrix composite materials. These involve composite materials made of metal and ceramic particles or fibers of varying lengths. In order to cast brake calipers, a composite material of aluminum and ceramic particles is especially suitable, for example particles of silicon carbide.

Such a metal-matrix composite material with ceramic particles is considerably less flexible than aluminum alloys. It allows the construction of lightweight brakes which are considerably reduced in construction space as opposed to brakes made of aluminum and nevertheless have a high rigidity. A disadvantage of this composite material is its high hardness which is attributable to the ceramic particles. A rough-cast caliper housing is thus very difficult to subsequently machine, in order, for example, to put in threading for the hydraulic fluid supply connection or a gasket ring groove in the brake cylinder. The processing is laborious, expensive and only possible using diamond tools, unless one is willing to put up with minimal service life for the tools. Subsequent machining is thus out of the question for economic reasons.

For the casting of metal-matrix composite materials, the known "lost-foam-process" is available. In this process, a high-resistance foam core of the caliper housing is manufactured which is embedded in a casting mold in sand and then cast using the metal-matrix composite material. It is possible to cast undercuts using this process so that the unfinished part does not have to be subsequently machined, at least as far as the undercuts are concerned. In this process, several subsequent machining steps are already saved. At other positions, a subsequent machining is necessary in spite of this, especially if very small tolerances are necessary, which cannot be achieved in the mold. This is regularly the case for threaded connections, piston bore holes, grooves or recesses.

SUMMARY OF THE INVENTION

The purpose of the invention is to create a brake caliper which consists of a metal-matrix composite material and for which designs having narrow tolerances such as threaded connections, piston bore holes or grooves can be manufactured economically.

The solution for this purpose results from the characterizing part of claim 1. In principle, the solution consists in forming the positions of the caliper provided for an exact subsequent machining from a softer and easier to process material, in particular an aluminum alloy. Putting in the easier to process material occurs, in a first embodiment according to the process claim 8, in the form of insert pieces which are embedded in the high-resistance foam core of the caliper housing, are cast in using the metal-matrix composite material during casting, and then enter into a tight connection with this material. After that the resulting unfinished part can be completed by machining the insert pieces.

Insert pieces are particularly used in the brake cylinder and at the supply connection for the hydraulic fluid. It is functional to also provide an insert piece for a bleeder opening. In a refinement of the invention, the tight connection between the insert pieces and the metal-matrix composite material is further improved by providing the insert piece with a denticulation or fluting.

In a second embodiment of the invention, the insert pieces are not cast in. In this case, the caliper housing is manufactured according to the process described in claim 9. Here an unfinished housing piece is first manufactured from metal-matrix composite material. The insert pieces are cast separately, finished, and afterwards inserted into the unfinished housing piece. In a preferred embodiment, a single combined insert piece, which is inserted into the precision-cast cylinder opening, is sufficient for the brake cylinder and the hydraulic connection. In this way, the combined insert piece can be mounted by being pressed into its installed position, or it can be secured by a bolt at the supply connection and connected to the unfinished housing piece.

BRIEF DESCRIPTION OF THE DRAWINGS

Embodiment examples of the invention are explained more closely in the following using the drawings:

Shown are:

FIG. 1 a section through a high-resistance foam core having an insert piece in the brake cylinder, having the same shape as a rough-cast caliper prior to subsequent machining;

FIG. 2 a partial representation of the rough casting of FIG. 1 in another sectional plane;

FIG. 4 a representation like FIG. 2 after performance of the subsequent machining;

DETAILED DESCRIPTION OF THE INVENTION

Figure 3:
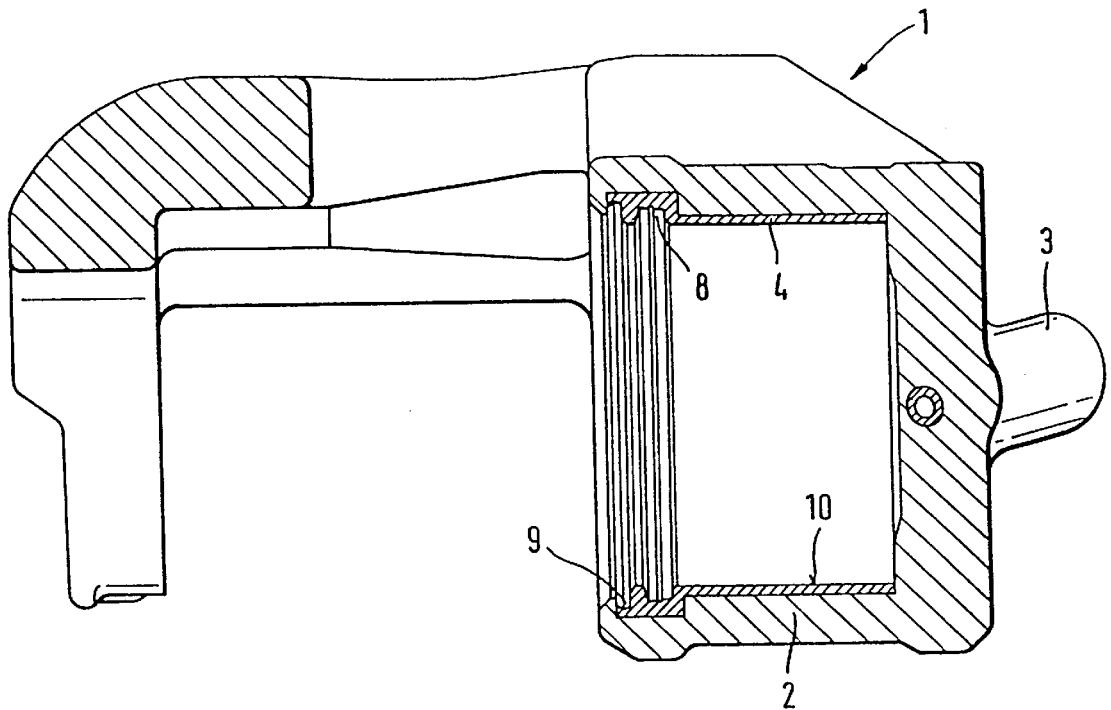
FIG. 3 the rough caliper of FIG. 1 after performance of the subsequent machining.

In the figures, a brake caliper for disk brakes is seen, having a caliper housing 1, which has a hydraulic brake cylinder 2 and a supply connection 3 for the supply of hydraulic fluid. The caliper housing 1 is essentially made up of a metal-matrix composite material based on aluminum with ceramic particles.

In a first embodiment of the invention, the brake cylinder 2 is provided with a first insert piece 4 and the supply connection 3 is provided with a second insert piece 5 made of an aluminum alloy. The insert pieces 4,5 are softer than the metal-matrix composite material and thus also easy to machine using normal tools.

The manufacture of the caliper housing 1 is done "lost-foam casting." There a high-resistance foam core is manufactured first in the shape of the caliper housing 1 and provided with the insert pieces 4,5. Because of the similarity of shape between the high-resistance foam core and the caliper housing 1, FIG. 1 can also be viewed as a representation of the high-resistance foam core. The high-resistance foam core is then embedded in a casting mold in sand and cast using metal-matrix composite material, such that the high-resistance foam core is burned up and the insert pieces 4,5 are cast in by the composite material and enter into a tight connection with it. The resulting unfinished piece of the caliper housing 1 is as according to the illustrations of FIGS. 1 and 2. Then the unfinished piece is finished by subsequent machining of the insert pieces 4,5. In this process, as shown in FIG. 4, a channel 6 and a threading 7 for the supply connection 3 are put into the insert piece 5. For the insert piece 4, a gasket ring groove 8 and a groove 9 for a protective cap are put in, based on the representation of FIG. 3, and the cylinder bore 10 is subsequently machined.

Figure 6:
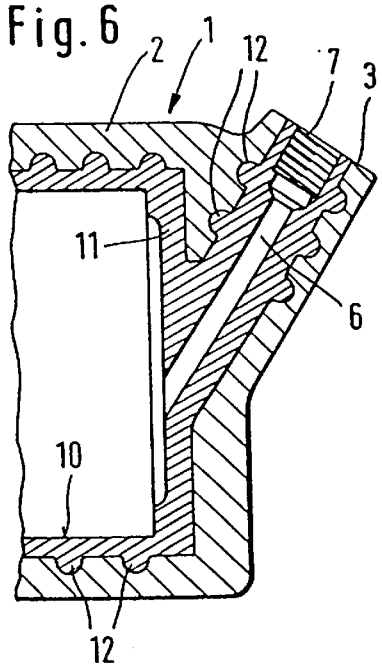
FIG. 6 the embodiment example of FIG. 5 after performance of the subsequent machining.
Figure 5:
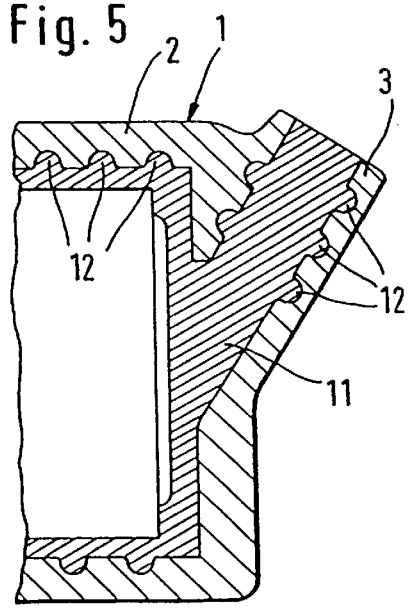
FIG. 5 a second embodiment example of the invention having a single, fluted insert piece in a representation corresponding to FIG. 2.

In a variation of the invention, only one insert piece 11, constructed as a single piece and equipped with fluting 12 on its outside walls for an improved form-fit, is provided for the supply connection 3 and the brake cylinder 2. The subsequent machining is done in the same manner as for the first embodiment by putting a channel 6 and a threading 7 into the supply connection 3 (FIG. 6) and by subsequently machining the cylinder bore 10 and the gasket ring groove 8 as well as the protective cap groove 9, not shown in FIG. 6.

Figure 7:
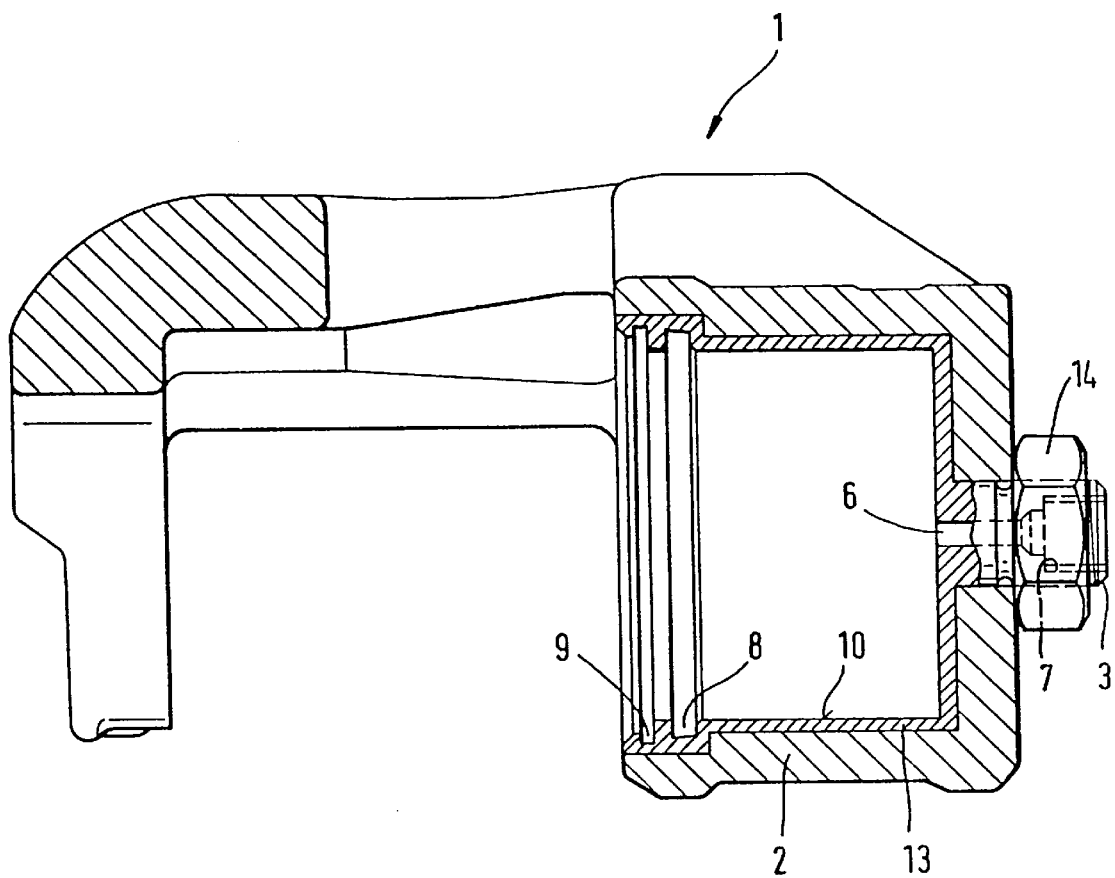
FIG. 7 embodiment of the invention using a finished and bolted-in insert piece, in a representation corresponding to FIG. 3.

A second embodiment of the invention is represented in FIG. 7. Here, a modified insert piece 13 is used which is designed as a single piece and is for combined use in the brake cylinder 2 and in the hydraulic connection 3. The insert piece 13 is not cast in, however. Instead, in manufacturing the caliper housing 1, an unfinished piece is then manufactured using "lost-foam-casting," which consists, however, only of the metal-matrix composite material. The insert piece 13 is cast separately out of an aluminum alloy and finished, such that the channel 6, the threading 7, the cylinder bore 10, the gasket ring groove 8 and the protective cap groove 9 are put into it. The finished insert piece 13 is then inserted into the unfinished housing piece and tightly bolted and secured to the caliper housing 1 with a threaded connection screwing on nut 14.

The invention can, of course, also be advantageously extended for the manufacture and design of a brake mount, with which the brake caliper is attached on the stub axle of the vehicle and is guided in an axially movable way.

We claim:

1. Brake caliper for disk brakes, having a caliper housing, which has a hydraulic brake cylinder and a supply connection for hydraulic fluid, characterized in that the caliper housing is essentially made up of a metal-matrix composite material and, at the least, the brake cylinder and the supply connection are provided with one or more insert pieces made of easily machinable material wherein a combined insert piece for the brake cylinder and the supply connection is inserted or pressed into the cast cylinder opening.

2. Brake caliper according to claim 1, characterized in that the insert pieces are made of aluminum or an aluminum alloy with an elevated melting point.

3. Brake caliper according to claim 1, characterized in that the insert pieces are cast.

4. Brake caliper according to claim 1, characterized in that an insert is provided for a bleeder opening.

5. Brake caliper according to claim 1, characterized in that the insert pieces are provided with a denticulation or fluting.

6. Brake caliper according to claim 1, characterized in that the combined insert piece is secured by a threaded connection to the supply connection and is connected to the caliper housing.

* * * * *